US012647907B2

(12) United States Patent　　　　　(10) Patent No.: US 12,647,907 B2

BenAmmar et al.　　　　　　　　　　　　(45) Date of Patent: Jun. 2, 2026

(54) TRANSMIT POWER DENSITY LIMIT NORMALIZATION FOR ELECTRONICALLY STEERABLE ANTENNAS WITH SCAN ANGLE VARYING DENSITY LIMIT

(71) Applicant: Hughes Network Systems, LLC, Germantown, MD (US)

(72) Inventors: Nassir BenAmmar, North Bethesda, MD (US); Subramanya Krishna, Rockville, MD (US); Channasandra Ravishankar, Clarksburg, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 404 days.

(21) Appl. No.: 18/495,072

(22) Filed: Oct. 26, 2023

(65) Prior Publication Data

US 2025/0024384 A1　Jan. 16, 2025

Related U.S. Application Data

(60) Provisional application No. 63/513,249, filed on Jul. 12, 2023.

(51) Int. Cl.
　　*H04B 7/185*　　(2006.01)
　　*H04W 52/36*　　(2009.01)
(52) U.S. Cl.
　　CPC ....... *H04W 52/367* (2013.01); *H04W 52/365* (2013.01)
(58) Field of Classification Search
　　CPC .. H04W 52/367; H04W 52/365; H04W 52/42

USPC ........................................................ 370/318
See application file for complete search history.

(56) References Cited

U.S. PATENT DOCUMENTS

| | | | | |
|---|---|---|---|---|
| 3,835,469 | A * | 9/1974 | Chen ..................... | H01Q 3/2658 |
| | | | | 343/754 |
| 4,507,662 | A * | 3/1985 | Rothenberg ......... | H01Q 3/2658 |
| | | | | 343/754 |
| 6,147,657 | A * | 11/2000 | Hildebrand .......... | H01Q 21/205 |
| | | | | 343/844 |
| 6,965,851 | B2 * | 11/2005 | Tillotson ............... | H04W 16/18 |
| | | | | 455/448 |
| 7,454,202 | B2 * | 11/2008 | de La Chapelle . | H04B 7/18508 |
| | | | | 455/431 |
| 9,595,756 | B1 * | 3/2017 | Buckley ............... | H01Q 19/005 |
| 9,689,955 | B2 * | 6/2017 | Rosenbaum ............. | G01S 3/46 |
| 10,135,126 | B2 * | 11/2018 | Diamond ................. | H01Q 3/02 |
| 10,211,530 | B2 * | 2/2019 | Dang ................. | H04B 7/18506 |
| 10,283,876 | B1 * | 5/2019 | Livadaru .............. | H01Q 21/245 |
| 10,446,942 | B2 * | 10/2019 | Pruett ................... | G01S 13/426 |

(Continued)

FOREIGN PATENT DOCUMENTS

| | | |
|---|---|---|
| EP | 3 968 456 A1 | 3/2022 |
| EP | 4 096 117 A1 | 11/2022 |

*Primary Examiner* — Amancio Gonzalez

(74) *Attorney, Agent, or Firm* — Kilpatrick Townsend & Stockton LLP

(57) ABSTRACT

Techniques described herein provide transmit power density limit normalization for electronically steerable antenna subsystems in user terminals having scan angle varying power spectral density limits. Embodiments can further simplify or eliminate impacts on UT modem and/or satellite ground networks, and can remove dependencies on the UT antenna type and its antenna performance characterization.

20 Claims, 8 Drawing Sheets

(56)       References Cited

U.S. PATENT DOCUMENTS

| | | | | |
|---|---|---|---|---|
| 10,674,376 | B2 * | 6/2020 | Walker | H04W 16/28 |
| 10,754,020 | B2 * | 8/2020 | Holt | G01S 13/4472 |
| 10,819,321 | B1 * | 10/2020 | Zaiden | H03H 11/32 |
| 10,833,757 | B1 * | 11/2020 | Dana | H04B 7/18513 |
| 10,847,880 | B2 * | 11/2020 | Pruett | H01Q 21/08 |
| 10,985,833 | B2 * | 4/2021 | Mendelsohn | H01Q 3/20 |
| 11,284,354 | B2 * | 3/2022 | Noel | H04B 7/18519 |
| 11,476,577 | B2 * | 10/2022 | Merola | H01Q 3/46 |
| 11,569,587 | B1 * | 1/2023 | McCarrick | H01Q 21/065 |
| 11,677,140 | B2 * | 6/2023 | Stoleru | H01Q 3/24 |
| | | | | 343/705 |
| 11,811,489 | B2 * | 11/2023 | Hultman | H04B 7/18513 |
| 11,831,346 | B2 * | 11/2023 | McGarrahan | H04B 7/18528 |
| 11,881,611 | B2 * | 1/2024 | Steward | H01Q 1/2283 |
| 11,901,630 | B1 * | 2/2024 | Cherrette | H01Q 3/20 |
| 12,099,116 | B2 * | 9/2024 | Finley | G01S 7/411 |
| 12,266,864 | B1 * | 4/2025 | West | H01Q 9/0407 |
| 12,347,939 | B2 * | 7/2025 | Leung | H01Q 9/0485 |
| 2007/0188378 | A1 * | 8/2007 | Li | H01Q 21/22 |
| | | | | 342/360 |
| 2009/0096857 | A1 * | 4/2009 | Frisco | H04N 21/226 |
| | | | | 348/14.02 |
| 2017/0222327 | A1 * | 8/2017 | Retter | H01Q 3/2658 |
| 2019/0140362 | A1 * | 5/2019 | Edenfield | H01Q 21/24 |
| 2021/0234270 | A1 * | 7/2021 | Stoleru | H01Q 3/247 |
| 2021/0408678 | A1 * | 12/2021 | Dang | G01S 19/02 |
| 2022/0256471 | A1 | 8/2022 | Noel et al. | |
| 2023/0189018 | A1 * | 6/2023 | Petersson | H01Q 3/28 |
| | | | | 455/101 |
| 2024/0356214 | A1 * | 10/2024 | Steward | H01Q 21/0037 |
| 2025/0007154 | A1 * | 1/2025 | Sun | H01Q 3/247 |

* cited by examiner

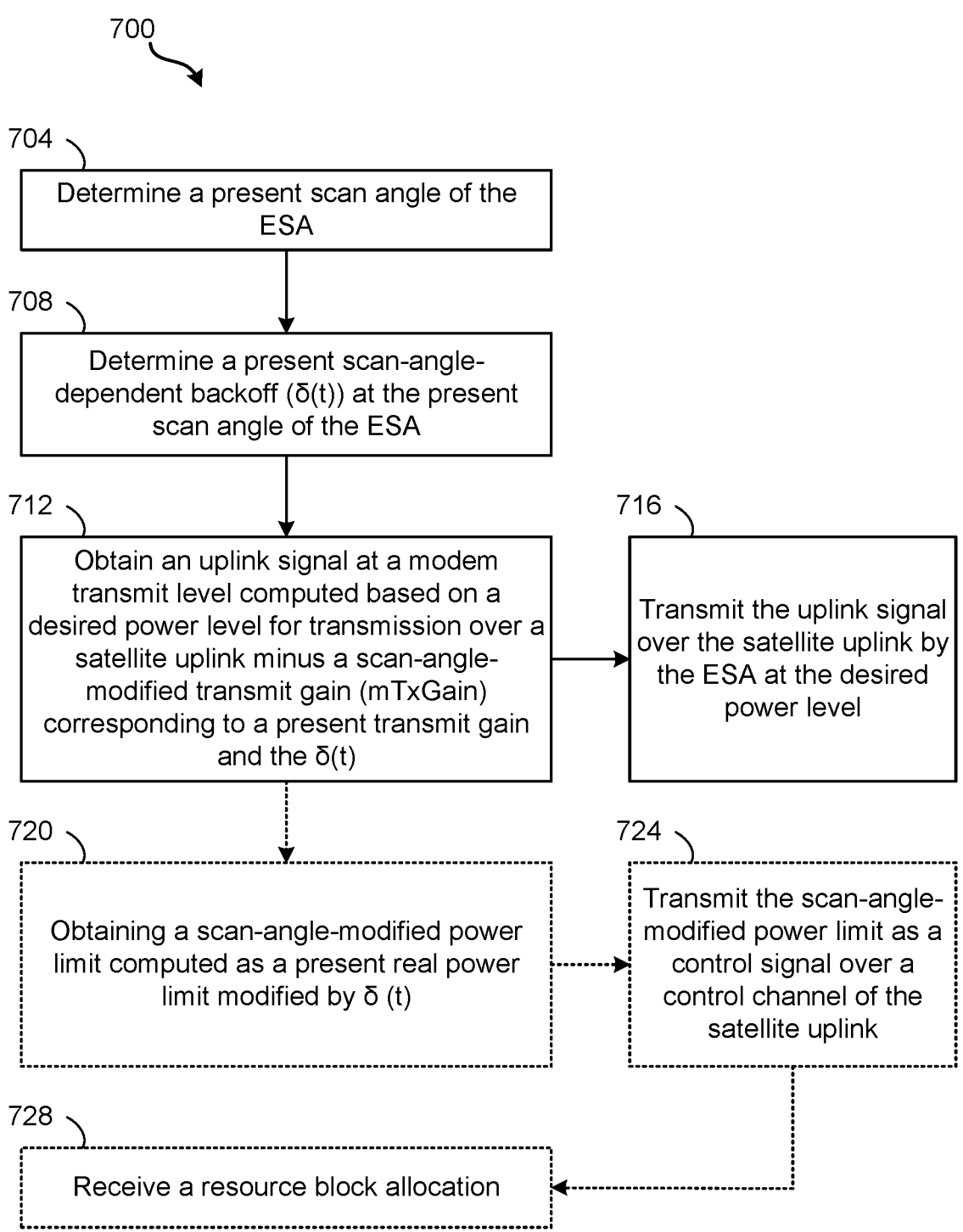

700

704
Determine a present scan angle of the ESA

708
Determine a present scan-angle-dependent backoff (δ(t)) at the present scan angle of the ESA 712
Obtain an uplink signal at a modem transmit level computed based on a desired power level for transmission over a satellite uplink minus a scan-angle-modified transmit gain (mTxGain) corresponding to a present transmit gain and the δ(t)

716
Transmit the uplink signal over the satellite uplink by the ESA at the desired power level 720
Obtaining a scan-angle-modified power limit computed as a present real power limit modified by δ (t)

724
Transmit the scan-angle-modified power limit as a control signal over a control channel of the satellite uplink 728
Receive a resource block allocation

TRANSMIT POWER DENSITY LIMIT NORMALIZATION FOR ELECTRONICALLY STEERABLE ANTENNAS WITH SCAN ANGLE VARYING DENSITY LIMIT

CROSS REFERENCE TO RELATED APPLICATION

This application claims priority to Provisional U.S. Patent Application No. 63/513,249 filed Jul. 12, 2023, entitled "TRANSMIT POWER DENSITY LIMIT NORMALIZATION FOR ESA UTS WITH SCAN ANGLE VARYING DENSITY LIMIT," the entire disclosure of which is hereby incorporated by reference, for all purposes, as if fully set forth herein.

BACKGROUND

In satellite communication systems, there are some requirements that user terminals (UTs) and antennas need to meet. One such requirement is the off-axis emission levels (i.e., sidelobes levels). The requirement is usually in the form of an equivalent isotropically radiated power (EIRP) mask imposed on the UT and the antenna. To meet such a requirement, a maximum power per bandwidth is defined and this applies to UTs with a mechanically steerable parabolic antenna or a non-steerable parabolic antenna. For electronically steerable antennas (ESA), the antenna performance and the off-axis emission are functions of the scan angle (the angle between zenith and the direction pointed to by the antenna) and the azimuth angle. Satisfying the UT transmit power mask further involves an adjustment to the maximum power per bandwidth limit.

SUMMARY

Embodiments include systems and methods for address different electronically steerable antennas (ESA), user terminal (UT) performance characterization and the dynamic nature of corresponding limits due to changing scan angle. For example, embodiments can operate in the context of a LEO satellite system where the pointing is constantly changing as the antenna tracks the moving satellite overhead. In particular, embodiments provide novel approaches to account for different maximum transmit power per bandwidth based on UT antenna type and antenna characterization. In addition to addressing these technical problems, approaches described herein are easier to implement, distribute, and well-contain. Embodiments also account for varying limits dictated by the antenna pointing direction and can simplify or eliminate impacts on the UT modem and/or satellite ground network.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 7 shows a flow diagram of an illustrative method for transmit power density limit normalization in a user terminal having an electronically steerable antenna (ESA).

DETAILED DESCRIPTION

Figure 1:
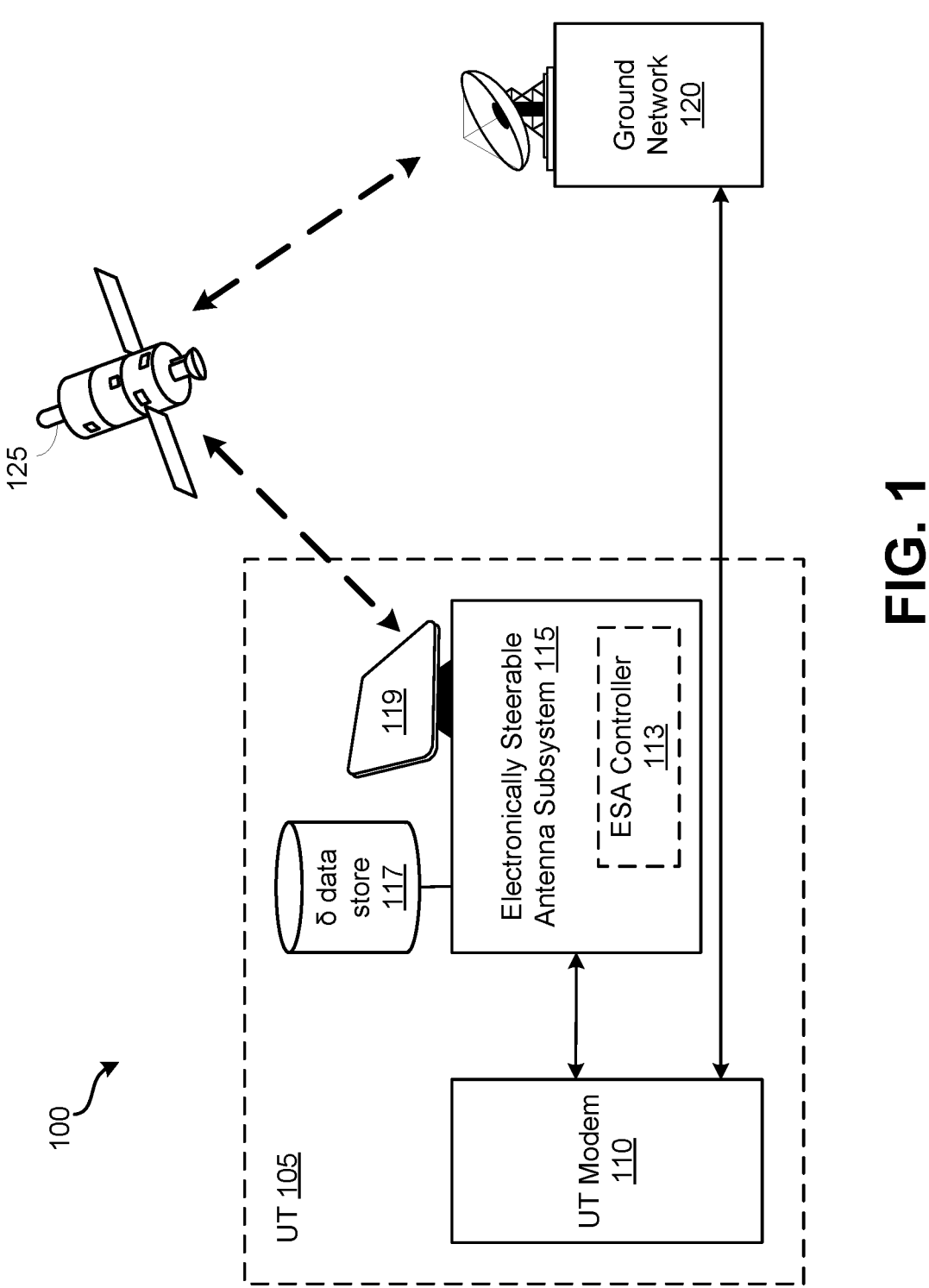
FIG. 1 shows an illustrative satellite communication system as a context for embodiments described herein.

FIG. 1 shows an illustrative satellite communication system 100 as a context for embodiments described herein. As illustrated, the system 100 includes a user terminal (UT) 105 having a UT modem 110 coupled with an electronically steerable antenna (ESA) subsystem 115. The UT 105 is in communication with a ground network 120 (e.g., a satellite ground base station) via one or more satellites 125. For example, the satellite 125 is a low Earth orbit (LEO) satellite, and the ESA subsystem 115 maintains pointing and tracking as the satellite 125 changes its relative position with respect to the UT 105.

Transmissions from the antennas in satellite communication systems (i.e., uplink to the satellite 125) have certain limits imposed on them, for example, by technical specifications and regulations. For example, the antenna is only allowed to be within specified off-axis emission levels (i.e., sidelobe power levels), which are imposed on the antenna (e.g., and/or the UT) usually expressed in the form of an equivalent isotropically radiated power (EIRP) mask. This specification can be considered as a power limit, such that satisfaction of the specification involves keeping the antenna transmissions to within a defined maximum power per bandwidth.

As illustrated, the ESA subsystem 115 includes an ESA 119. The ESA 119 can be electronically (and, in some cases, also mechanically) steered to maintain pointing and tracking. For an ESA subsystem 115, changes to the scan angle of the ESA 119 manifest dynamically changing performance characteristics. One such dynamic change is that the off-axis emission of the ESA subsystem 115 is a function of the scan angle. Thus, satisfying the UT transmit power mask further involves adjusting the maximum power per bandwidth limit (i.e., a power spectral density limit) based on the present scan angle of the ESA subsystem 115. For example, as the ESA subsystem 115 points to a lower angle, the performance can worsen, such that a reduction in transmission power may be needed to ensure that sidelobe power levels stay within the defined limits. References herein to the pointing, steering, scan angle, azimuth, etc. of the ESA subsystem 115 are intended to mean pointing, steering, scan angle, azimuth, etc. of the ESA 119.

Embodiments described herein seek to address such dynamically changing performance characteristics and limits using transmit power density limit normalization. For example, embodiments seek to address different ESA 119 performance characterizations and the dynamic nature of related limits due to changing scan angle, such as in LEO satellite systems where the pointing is constantly changing as the antenna tracks the moving satellite overhead. While embodiments are described herein with reference to LEO satellites, embodiments are similarly applicable to other (i.e., non-LEO) satellite systems, such as medium-Earth orbit (MEO) satellite systems and Geostationary Earth Orbit (GEO) systems. Some features described herein relate to interactions with an uplink power control function. In some system 100 implementations, such an uplink power control function is implemented in the ground network 120 (e.g., in the context of a non-processing satellite, such as a bent-pipe satellite). In other system 100 implementations, such an uplink power control function is implemented in the satellite 125 (i.e., in a processing satellite). In other system 100 implementations, such an uplink power control function is implemented jointly by both the satellite 125 and the ground network 120.

Figure 2:
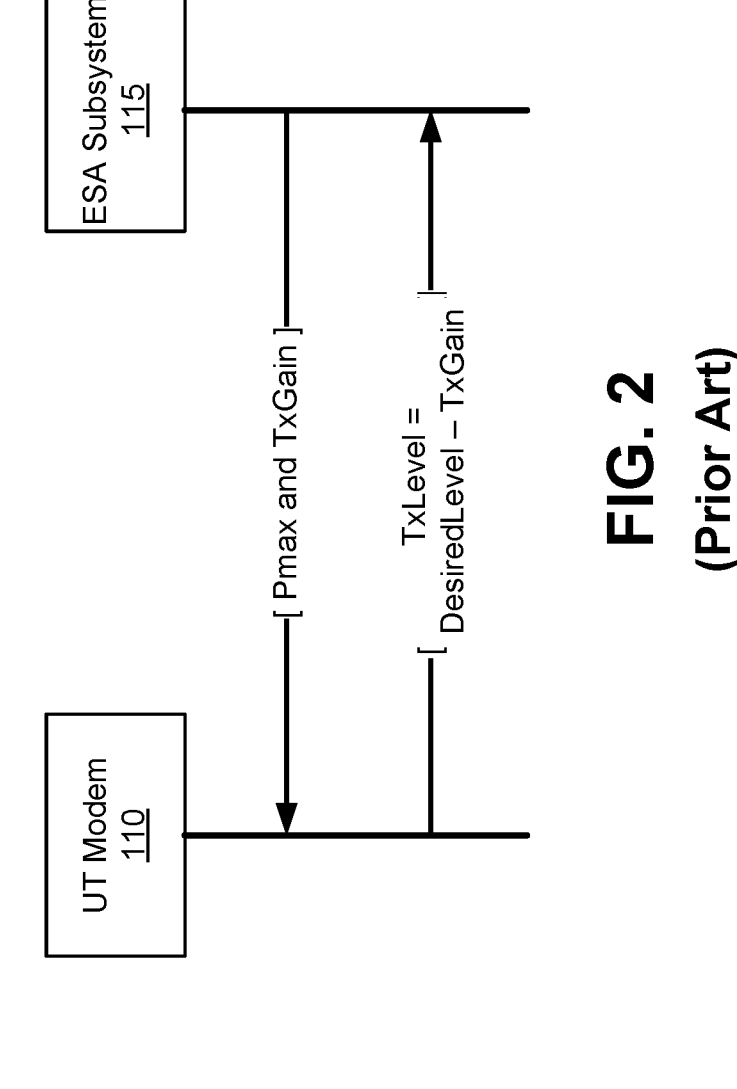
FIG. 2 shows an illustrative data exchange between a user terminal modem and an electronically steerable antenna (ESA) subsystem, such as those illustrated in FIG. 1.

FIG. 2 shows an illustrative conventional data exchange 200 between a user terminal (UT) modem 110 and an electronically steerable antenna (ESA) subsystem 115. As illustrated, the ESA subsystem 115 provides the UT modem 110 with its capability information. In particular, the ESA subsystem 115 can provide its maximum transmit power (Pmax) and its transmit power gain (TxGain). The UT modem 110 can use the information from the ESA subsystem 115 to set an output power level that will yield a target power level at the output of the ESA subsystem 115. For example, if it is desired for a signal to be transmitted to the satellite at a target transmit level (DesiredLevel), the UT modem 110 can output the signal at a transmit level (TxLevel) that is the target transmit level less the transmit power gain of the ESA subsystem 115 (i.e., TxLevel=DesiredLevel−TxGain, as illustrated).

The target transmit level for the UT modem 110 can be determined based on several factors. For example, embodiments of the UT modem 110 calculate a link budget (e.g., for a round-trip communication between the UT modem 110 and the satellite). The calculation can assess characteristics, such as path loss, propagation effects (e.g., from rain, fog, or other atmospheric conditions), interference from other sources, regulatory power limits, etc. The target transmit level can also be determined based on factors, such as modulation and/or coding schemes, quality of service (QoS) levels, etc. The target transmit level can also be determined based on satellite and/or antenna characteristics, such as orbit, altitude, antenna features, satellite visibility, etc.

Conventionally, the UT, and specifically the UT modem 110, periodically provides the ground network with information on its transmit power level using control signaling. For example, the message can carry similar information as in the Third Generation Partnership Project (3GPP) Long Term Evolution (LTE) Extended Power Headroom Report (E-PHR) control message, where Pmax (i.e., the UT maximum transmit power at the output of its antenna) is sent along with a power headroom value indicating the difference between Pmax and a current UT transmit power level of the signal.

Using this information, the ground network calculates the power spectral density (i.e., power level in decibel-watts per Hertz, dBW/Hz), as the ground network knows the bandwidth that was allocated to the UT that carried the power control message. Using this information, the ground network can compare the UT's power spectral density limit to a maximum allowed limit (needed to meet the transmit mask). The UT's power spectral density plays a role in the uplink power control decision. For example, if the UT's power spectral density is at or within a threshold distance from the limit, then the ground network does not request that the UT transmit at a higher level. This power spectral density limit is referred to herein as "TxNominalMaxDensity." In a similar fashion, the UT modem 110 may enforce not exceeding this power spectral density either when the ground network requests that the UT increases its transmission power, or when the UT autonomously tries to increase its power level based on forward signal information (open loop power control). In an alternative network architecture implementation, the UT can alternatively or additionally know its maximum power limit and can adjust accordingly.

References herein to a "different transmit power level" mean a different power per Hz level, and do not refer to changes in the transmission level because of the higher or lower bandwidth allocation. The following illustrative equation for calculating transmit power is found in the Third Generation Partnership Project (3GPP) Technical Specification (TS) 36.213 V11.0.0, section 5.1.1.1:

$$P_{PUSCH,c}(i) =$$
$$\min\left\{\begin{array}{l} P_{CMAX,c}(i), \\ 10\log_{10}(M_{PUSCH,c}(i)) + P_{O\_PUSCH,c}(j) + \alpha_c(j)\cdot PL_c + \Delta_{TF,c}(i) + f_c(i) \end{array}\right\}$$
$$[dBm]$$

Similar concepts are used, or can be found, in other satellite communication air interfaces and in this document. In the above equation, power allocations are based on resource blocks (RBs). An RB is a smallest unit of bandwidth that can be allocated to a UT. For example, each RB may represent a 180 KHz block of a subcarrier. The above equation has two components: (1) the UT transmit power of one RB, defined by $P_{O\_PUSCH,c}(j) + a_c(j)\cdot PL_c + \Delta_{TF,c}(i) + f_c(i)$; and (2) the number of RBs allocated, defined by $M_{PUSCH,c}(i)$. The number of RBs (the bandwidth) modulates the power per RB in this case.

Returning to FIG. 1, some ESA terminals (i.e., a UTs 105 with ESA subsystems 115) may not meet the transmit mask (the off-axis emission) at all scan angles when operating with TxNominalMaxDensity, and such terminals may need to use a lower power spectral density limit. The amount of scan-angle-dependent backoff needed to meet the transmit mask is referred to herein as δ, such that a scan-angle-dependent reduction in power spectral density limit can be represented as TxNominalMaxDensity-S. Practically, staying within a dynamically changing power spectral density limit involves the modem and/or and the ground network being aware of δ and making necessary adjustments. The value of δ tends to vary as a function of the scan angle and azimuth, and it tends to be well defined. Each ESA type has a different 6 profile that is inherent to the design of the antenna. For example, ESAs with different numbers and/or types of radiating elements, different sizes and or shapes of antennas, different manufacturers, etc. can have different associated δ values for different scan angles. In addition, mobile UTs 105 with varying roll, pitch, and yaw experience additional variation in the azimuth and scan angle with reference to the antenna plane and to the value of δ. For example, such additional variations are seen in cases where the antenna is mounted on an airplane or ship; or with a hybrid antenna, where an ESA is mounted on a mechanical apparatus that assists in pointing and changes the roll, pitch, and yaw of the ESA plane. As such, the term "scan angle" as used herein can include both scan angle and azimuth where appropriate to the ESA type and/or condition, and the term "scan-angle-dependent" can include dependence on both scan angle and azimuth where appropriate to the ESA type and/or condition.

Requiring the UT modem 110 and/or ground network to know about δ involves additional signaling, where the value is constantly sent to the UT modem 110 and/or ground network 120. Optionally, knowledge of δ can involve the ground network 120 knowing about the scan angle and azimuth of the ESA subsystem 115, such as by using its position in cases where roll, pitch, and yaw do not change. Such an approach would be impacted by scheduling and protocol delays associated with sending S and possibly new control messages. Embodiments herein do not rely on the UT modem 110 or ground network 120 (or processing satellite 125) maintaining knowledge of δ for the ESA subsystem 115. Nonetheless, embodiments described herein can monitor and operate the ESA subsystem 115 with a target dynamically changing power spectral density.

As illustrated, embodiments of the ESA subsystem 115 include a δ data store 117 to store values of δ for different scan angles (e.g., and azimuths). The values of δ for different scan angles can be stored in any suitable manner, such as in a lookup table in non-transitory storage. The δ values can be determined in any suitable manner for a particular ESA subsystem 115. In some cases, the antenna manufacturer performs computational simulations on the antenna design for the ESA type of an ESA subsystem 115, and the simulation results can be used to estimate δ for different scan angles (e.g., and/or azimuths) for all ESA subsystems 115 of that ESA type to ensure that all sidelobes are within limits set by design requirements (e.g., EIRP mask, regulatory requirements, etc.). In other cases, measurements can be performed on a specimen of a particular ESA type, and the measurements can be used to compute δ for different scan angles. In some other cases, the values of δ can be downloaded to ESA from a central server. This allows δ values to be updated to all ESA of a given type, for example when the regulatory mask gets updated by the operator.

The δ values can be stored in the δ data store 117 at any suitable resolution of scan angles (e.g., and azimuth). In some implementations, the δ data store 117 has at least one δ value entry for every N degrees of scan angle between a zenith angle (e.g., zero degrees) and a maximum scan angle (e.g., 70 degrees). For example, N can be 2, 10, etc. In other implementations, the δ data store 117 has a greater resolution of δ value entries for scan angles that are closer to the maximum scan angle. For example, the δ data store 117 can have a lookup table of one δ value entry for every ten degrees of scan angle between zero and 30 degrees, one δ value entry for every 5 degrees of scan angle between 30 and 50 degrees, and one δ value entry for every two degrees of scan angle between 50 and 70 degrees. The resolution and/or distribution of δ value entries can be determined by the antenna manufacturer based on seeking to maximize power per bandwidth (i.e., seeking to maximize throughput) while staying within design requirements (e.g., ensuring sidelobes stay within the EIRP mask limits). Further, the resolution can be limited by the resolution at which the ESA subsystem 115 can determine its scan angle (e.g., and azimuth). For example, if the ESA subsystem 115 can only measure its scan angle to a tolerance of two degrees, there may be no reason to have more than one δ value entry for each two-degree increment in scan angle.

As illustrated, embodiments of the ESA subsystem 115 can include an ESA controller 113. The ESA controller 113 can be implemented using any suitable one or more processors. For example, the ESA controller 113 can include a central processing unit CPU, an application-specific integrated circuit (ASIC), an application-specific instruction-set processor (ASIP), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. Features of the ESA subsystem 115 can thus be implemented as processor-readable instructions stored on a non-transitory, processor-readable medium, which are executed to effect features described herein. In some implementations, such instructions are stored in a same storage medium as the δ data store 117. In other implementations, the δ data store 117 is stored in separate storage media from the processor-readable instructions.

Similarly, the UT modem 110 can be implemented using any suitable one or more processors. For example, the UT modem 110 can include a central processing unit CPU, an application-specific integrated circuit (ASIC), an application-specific instruction-set processor (ASIP), a digital signal processor (DSP), a field-programmable gate array (FPGA), a programmable logic device (PLD), a controller, a microcontroller unit, a reduced instruction set (RISC) processor, a complex instruction set processor (CISC), a microprocessor, or the like, or any combination thereof. Features of the UT modem 110 can thus be implemented as processor-readable instructions stored on a non-transitory, processor-readable medium, which are executed to effect features described herein. In some implementations, the UT modem 110 and the ESA controller 113 are implemented as separate components, and each includes its own one or more processors and/or its own processor-readable storage media.

As described herein, the ESA controller 113 is configured to determine a present scan angle (e.g., including scan angle and azimuth, where appropriate) of the ESA 119. The ESA controller 113 can then determine a present scan-angle-dependent backoff (δ(t)) at the present scan angle of the ESA 119. As noted above, the determined δ(t) is one of several δ values stored at the ESA subsystem 115 (e.g., in the δ data store 117), each in association with a respective one or more scan angles. In one implementation, each δ value can be stored in a lookup table in association with a particular scan angle, and the δ(t) is selected as the δ value associated with the closest matching scan angle to the present scan angle. In another implementation, each δ value can be stored in a lookup table in association with a particular range of scan angles, and the δ(t) is selected as the δ value associated with the range of scan angles that includes the present scan angle. Embodiments of the ESA controller 113 can transmit to the UT modem 110 a scan-angle-modified transmit gain (mTx-Gain) corresponding to a present transmit gain and the δ(t). The ESA controller 113 can then receive, from the UT modem 110 responsive to transmitting the mTxGain, one or more uplink signals at a modem transmit level computed by the UT modem 110 based on a target power level for transmission over a satellite uplink minus the mTxGain.

For example, in each uplink transmission timeframe (e.g., subframe), the ESA controller 113 uses the above approach to obtain uplink signals at a modem transmit level for the timeframe. The ESA controller 113 can then direct transmission of the uplink signal over the satellite uplink, via the ESA 119, at a target power level that corresponds to the modem transmit level for the timeframe. As such, the uplink signals are transmitted in a manner that accounts for both the present transmit gain and the δ(t) of the ESA 119.

Figure 3:
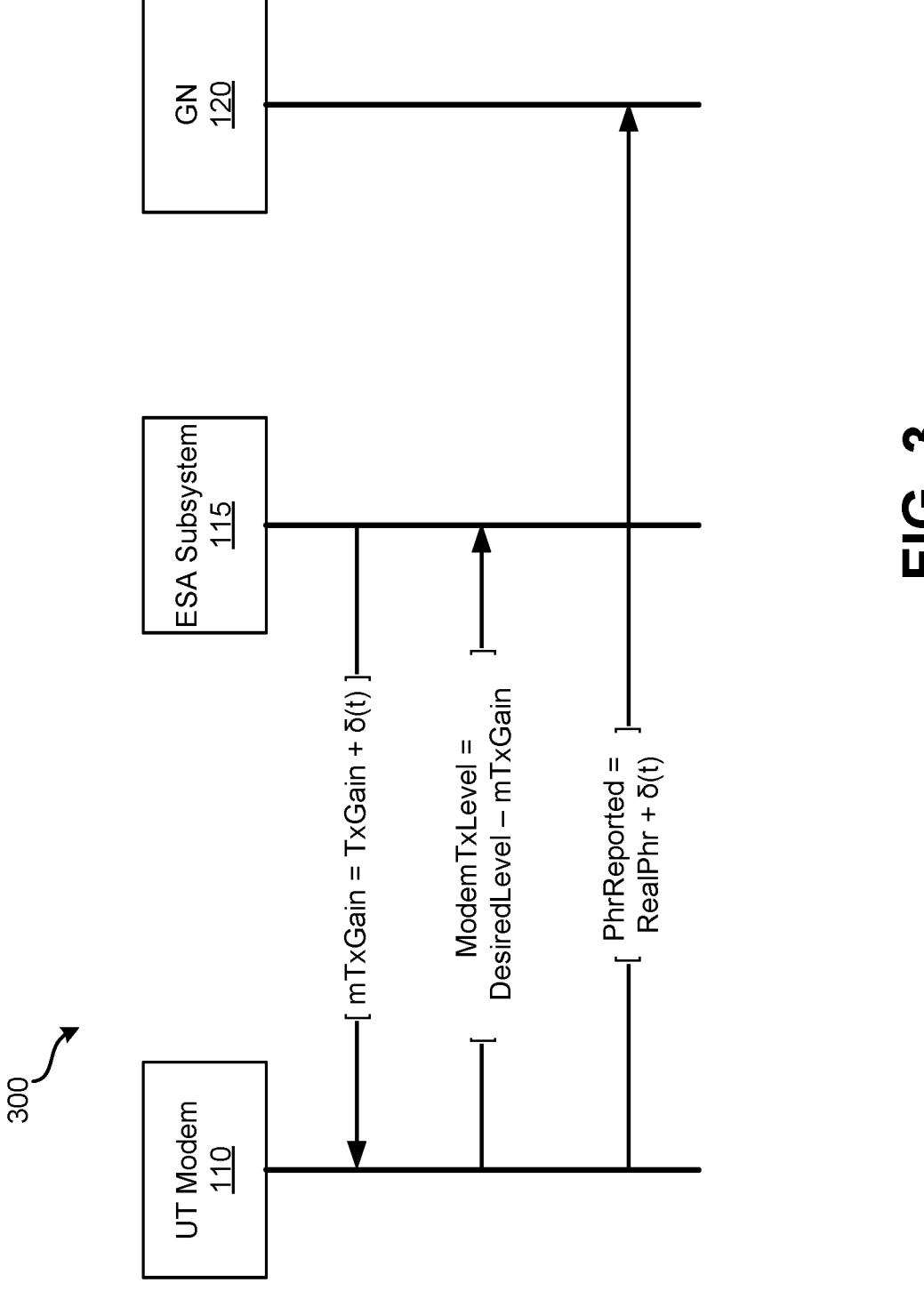
FIG. 3 shows an illustrative sequence diagram that uses power per resource block (RB), instead of power spectral density, to monitor and operate the ESA subsystem with a target dynamically changing power spectral density.

FIG. 3 shows an illustrative sequence diagram 300 that uses power per RB, instead of power spectral density (PSD), to monitor and operate the ESA subsystem 115 with a target dynamically changing power spectral density. For example, each RB can correspond to a 180 KHz block. As illustrated, an ESA subsystem 115 is in communication with a UT modem 110, and the UT modem 110 can also be in communication with a ground network 120. According to the illustrated sequence, the ESA subsystem 115 looks up its present δ in the δ data store 117 based on its present scan angle (e.g., scan angle and azimuth). Rather than reporting the "real" TxGain for the ESA subsystem 115, the ESA subsystem 115 reports a scan-angle-modified TxGain value (mTxGain) to the UT modem 110. For example, as illustrated in FIG. 2, the TxGain of the ESA subsystem can change over time with changes in temperature, and/or for other reasons; and ESA subsystems can conventionally report TxGain to the UT modem 110 as needed, periodically, etc. According to embodiments described herein, the ESA subsystem 115 also knows its own δ profile and its own scan angle, such that it also knows its present δ, or δ(t). Thus, instead of reporting the "real" TxGain to the UT modem 110, the ESA subsystem 115 reports mTxGain, which equals the TxGain+δ(t). In some embodiments, the mTxGain is reported by the ESA subsystem 115 as a single value. For example, the UT modem 110 expects to receive a TxGain value and instead receives the mTxGain value (e.g., the δ(t) is implicit in the reported mTxGain value). In other embodiments, the ESA subsystem 115 reports the real TxGain and the δ(t) separately (e.g., the δ(t) is reported explicitly). Either way, the UT modem 110 operates as if the present transmission gain of the ESA subsystem 115 is the mTxGain.

Responsive to receiving the mTxGain, the UT modem 110 determines a modem transmit power level (ModemTx-Level), which is defined as a target transmit power level (DesiredLevel) minus the mTxGain. The target level can be determined in several ways, such as based on a received forward signal, based on messaging from the ground network, etc. The UT modem 110 then sends uplink signals to the ESA subsystem at the ModemTxLevel. This will cause the ESA subsystem 115 to transmit over the satellite uplink at a power level reduced by δ(t) dB.

Concurrently or subsequently, the UT modem 110 can also send a control message (e.g., for transmission by the ESA subsystem 115 over a control channel to the satellite) to report the uplink power level (PowerPerRBReported) to the ground network or processing satellite. In some embodiments, the UT modem 110 reports this as a power headroom. The power level can be reported in any suitable manner so that the ground network or processing satellite can derive a power per bandwidth (e.g., a power per RB, power spectral density (PSD), etc.). Notably, the reported power level in the control message indicates a higher level than the real one (i.e., RealPowerPerRB+δ(t)). When the processing satellite and/or ground network receives the report and calculates the PSD, the calculated PSD will also be higher than the real level by δ(t). The same result would occur if the UT modem enforces the limit.

The PSD limit check can be described as follows:

$$(\text{ReportedPowerSpectralDensity} \geq \text{TxNominal-MaxDensity}) \tag{1}$$

Equation (1) can be equivalent to the following equations:

$$(\text{RealPowerSpectralDensity} + \delta(t) \geq \text{TxNominal-MaxDensity}) \tag{2}$$

$$(\text{RealPowerSpectralDensity} \geq \text{TxNominalMaxDensity} - \delta(t)) \tag{3}$$

These equations correspond to the check involved in accounting for δ variation over time. However, this is accomplished without explicitly sending δ(t) or deducing it from other means that are position based, which may carry additional error or may be limited to specific cases (e.g., a fixed UT with a known orientation). For example, some embodiments can be implemented to account for δ without any changes to conventional UT modem or ground network (or processing satellite) designs. In such embodiments, the UT modem, ground network, processing satellite, etc. can treat all UTs similarly, even though each UT may have a different present δ due to being a different ESA type, at a different scan angle, at a different azimuth, etc.

Figures 4A, 4B:
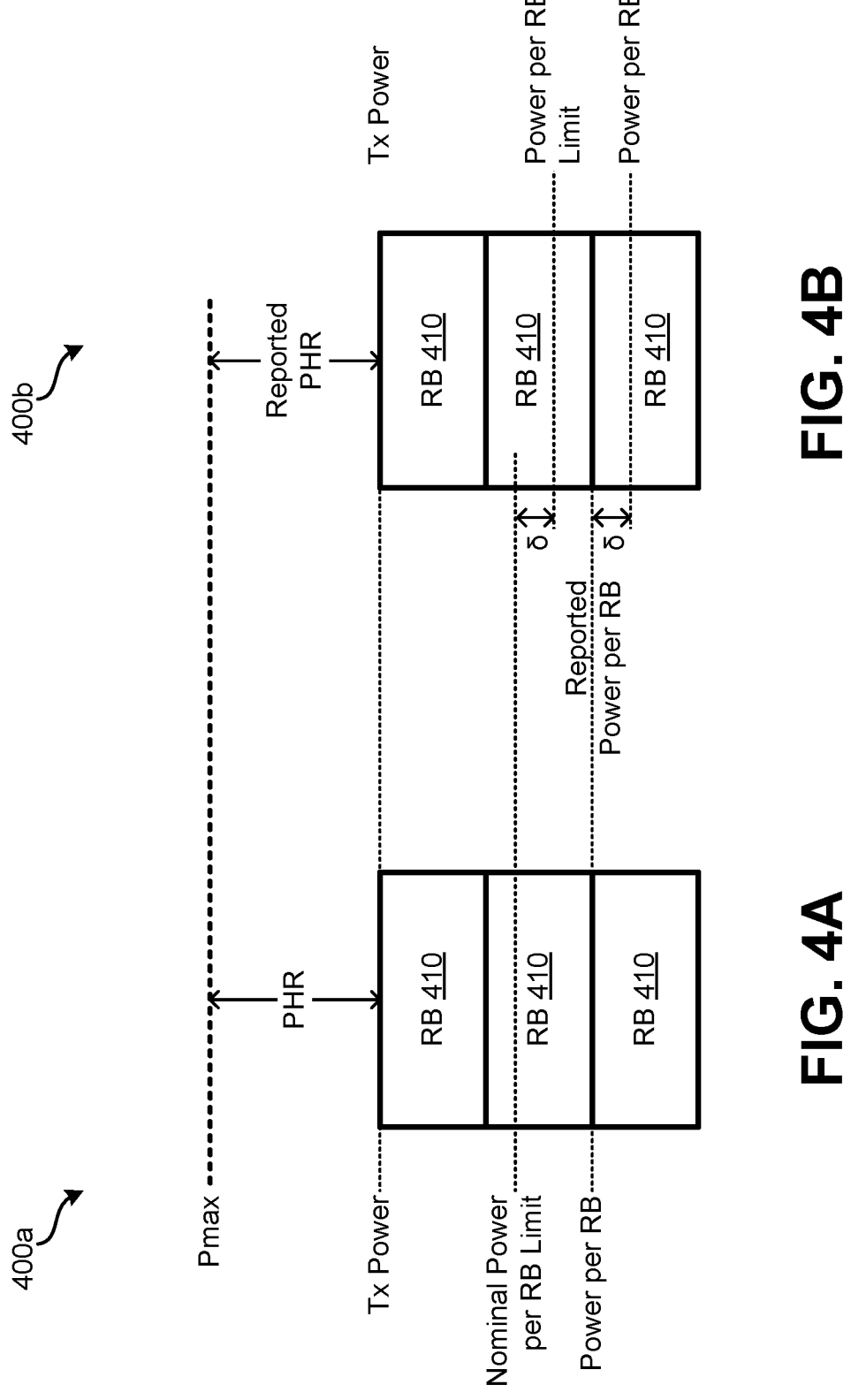
FIGS. 4A and 4B show illustrative representations of an example relationship between nominal limits and power levels.

FIGS. 4A and 4B show illustrative representations 400 of an example relationship between nominal limits and power levels. FIG. 4A shows a baseline power per resource block (RB) reporting relationship. FIG. 4B shows a power per RB reporting relationship that accounts for δ(t). Each of FIGS. 4A and 4B shows an illustrative three resource blocks 410. One resource block 401 (e.g., 180 KHz) is used as the minimum allocation to better illustrate the relationship, such that reference to "power per RB" in the illustrated case means power over 180 KHz. Similar relationships would be seen with different bandwidth allocations and power density reporting. It can be seen that δ can be derived from the power per RB reporting, without relying on explicit transmission of δ.

Such an approach additionally allows for quicker adjustments to δ, as the antenna and modem can continuously and frequently update Pmax and TxGain information. For example, if a increases, the transmit power level at the output of the antenna drops by the same amount; the antenna subsystem advertises a higher gain to the modem than the true current TxGain level (which may also be varying for other reasons). Note that this variation in the transmit power manifests itself in the receive SINR at the ground network or processing satellite. The change in SINR is treated and handled as any other channel variation using available tools (e.g., HARQ retransmission, link adaptation, and/or power control).

Figure 5:
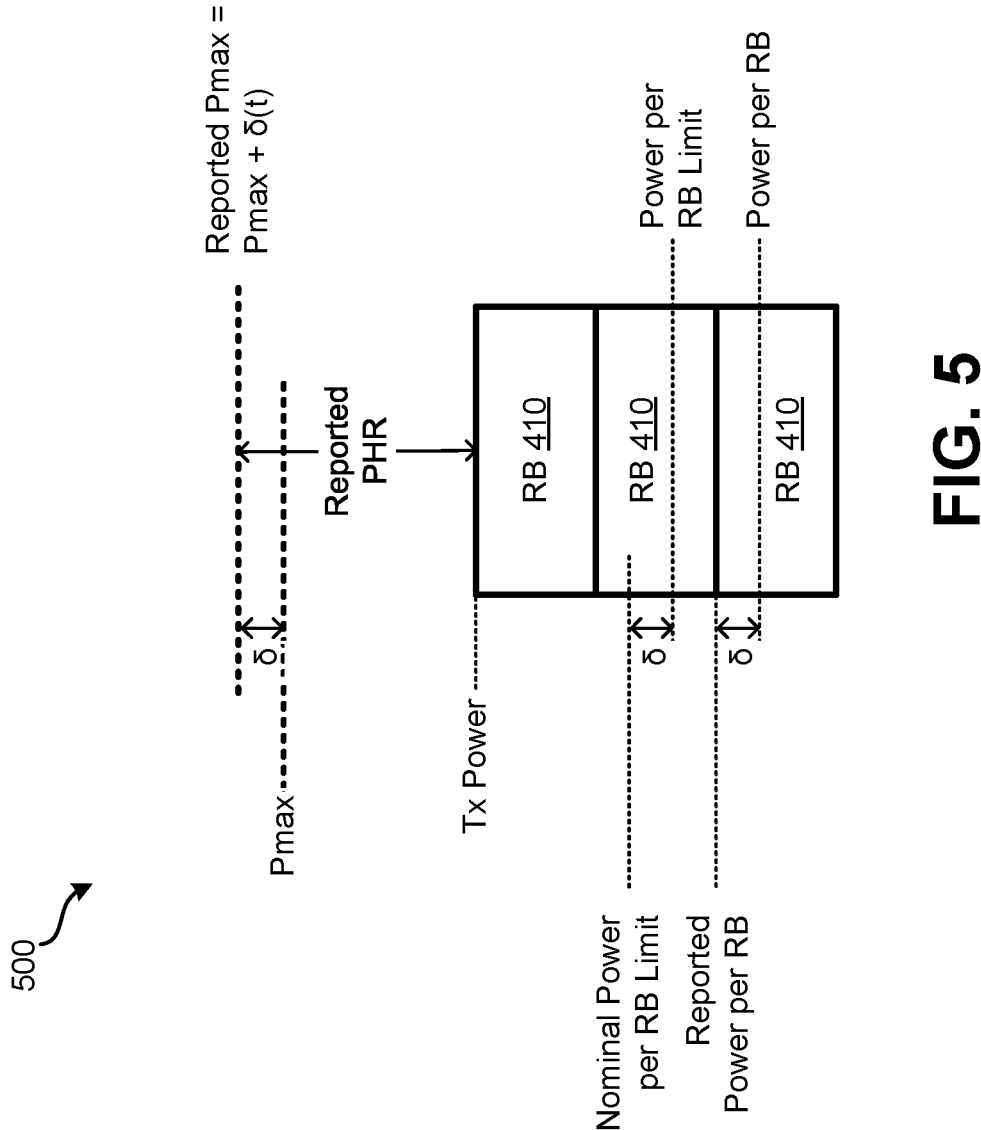
FIG. 5 shows a similar illustrative representation to that of FIG. 4B, and additionally indicates the impact on power headroom of a $\delta$-based adjustment to maximum power (Pmax).

FIG. 5 shows a similar illustrative representation 500 to that of FIG. 4B, and additionally indicates the impact on power headroom (PHR) of a δ-based adjustment to Pmax. The uplink resources may also provide the bandwidth (e.g., number of RBs) the UT shall send. The maximum number of resources that can be allocated are a function of the maximum UT power, Pmax, and the power density reported in dBW/Hz (or dBW/RB). The δ-inflated PSD used to normalize the check against the same TxNominalMaxDensity value may result in lower bandwidth allocation in some cases. To address that, the Pmax reported by the antenna subsystem to the modem and subsequently to the ground network can also be inflated by δ. The inflated value of Pmax results in a more accurate calculation of the bandwidth (e.g., number of RBs) that can be allocated to the UT and can avoid a drop in the maximum resources that can be allocated. The inflated value in Pmax can be determined as illustrated in FIG. 5.

Figure 6:
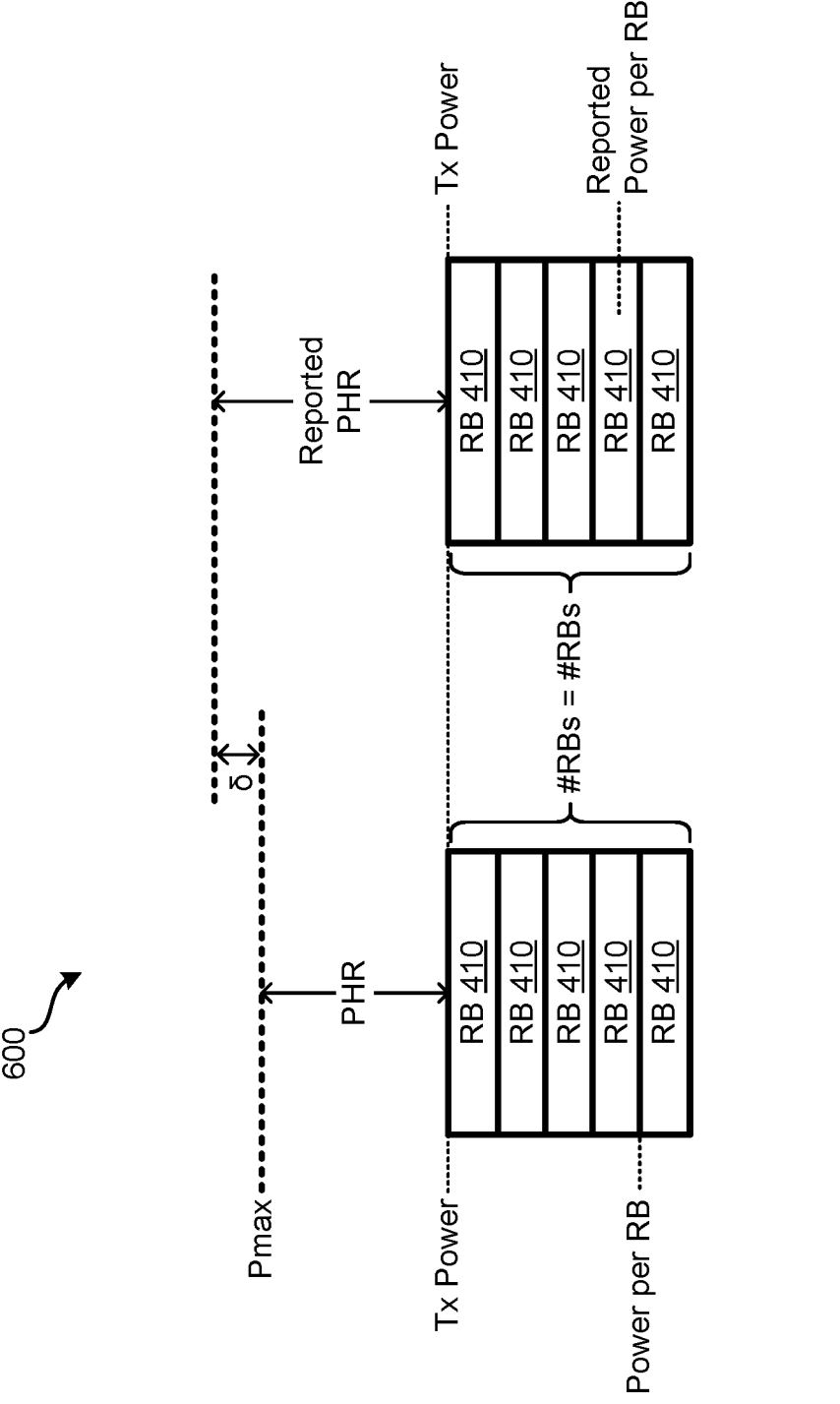
FIG. 6 shows an illustrative representation of RB allocations according to a baseline Pmax (left) and a $\delta$-adjusted Pmax (right).

It is notable that, while embodiments can result in an inflated power per RB, embodiments ensure that such an inflating does not impact (i.e., does not lower) the number of RBs allocated to the UT. For example, FIG. 6 shows an illustrative representation 600 of RB allocations according to a baseline Pmax (left) and a δ-adjusted Pmax (right). In general, reporting a power per RB that is higher than what is actually being used can result in a lower number of RB being allocated to the UT (e.g., by the ground network). For example, a scheduler (e.g., at the ground network or processing satellite) knows how many RBs were allocated to a particular UT, and can determine (e.g., from control messages) the uplink PHR for the UT and the Pmax. Based on that information, a power per RB can be derived, and the scheduler can determine the number of RBs at the power per RB that can fit within the Pmax (e.g., Pmax/PowerPerRB=maximum number of RBs that can be allocated to that UT). If the power per RB is inflated because of δ, fewer RBs will fit into the same Pmax.

To address this concern, embodiments report Pmax as adjusted by δ (i.e., reported Pmax=Pmax+δ). Accordingly, as illustrated in FIG. 6, the same maximum number of RBs is allocated to the UT, despite the inflated power per RB. For example, the reported PHR value is different due to the new Pmax reference, but the scheduler (e.g., ground network or processing satellite) still calculates the same power per RB (i.e., the adjusted Pmax does not impact the power per RB calculation). Also, the UT modem will not end up with a transmit power exceeding the true antenna limit because of the TxGain adjustment.

FIG. 7 shows a flow diagram of an illustrative method 700 for transmit power density limit normalization in a user terminal having an electronically steerable antenna (ESA). Embodiments of the method 700 can be implemented using any suitable system, such as by the ESA subsystem 115 (e.g., by the ESA controller 113) of FIG. 1. Embodiments of the method 700 begin at stage 704 by determining a present scan angle of the ESA. As noted herein, determining the scan angle can include determining an azimuth of the ESA. At stage 708, embodiments can determine a present scan-angle-dependent backoff (δ(t)) at the present scan angle of the ESA. The δ(t) is one of a plurality of stored δ values, each associated with a respective one or more scan angles (e.g., with a single angle, a range of angles, etc.). For example, the δ values are stored in a lookup table, or other suitable storage. In one embodiment, determining the δ(t) at stage 708 involves querying the plurality of stored δ values to determine δ(t) as the one of the plurality of stored δ values that is associated with the present scan angle of the ESA.

At stage 712, embodiments can obtain an uplink signal at a modem transmit level computed (e.g., by the UT modem) based on a target power level for transmission over a satellite uplink minus a scan-angle-modified transmit gain (mTxGain) corresponding to a present transmit gain and the δ(t). At stage 716, embodiments can transmit the uplink signal over the satellite uplink by the ESA at the target power level.

In some embodiments, at stage 720, the method 700 can further obtain a scan-angle-modified power limit computed as a present real power limit modified by δ(t). In some embodiments, the scan-angle-modified power limit is a scan-angle-modified power headroom (mPHR) computed based on a scan-angle-modified maximum uplink power level (mPmax) corresponding to a real maximum uplink power level plus δ(t), such that the mPHR corresponds to a real power headroom plus δ(t). Such embodiment, at stage 724, can transmit the scan-angle-modified power limit as a control signal over a control channel of the satellite uplink. For example, embodiments can transmit the mTxGain to a modem and can receive the modem transmit level as computed by the modem responsive to transmitting the mTx-Gain. As described herein, at stage 728, some embodiments of the method 700 can further receive a resource block allocation responsive to transmitting the scan-angle-modified power limit.

Figure 8:
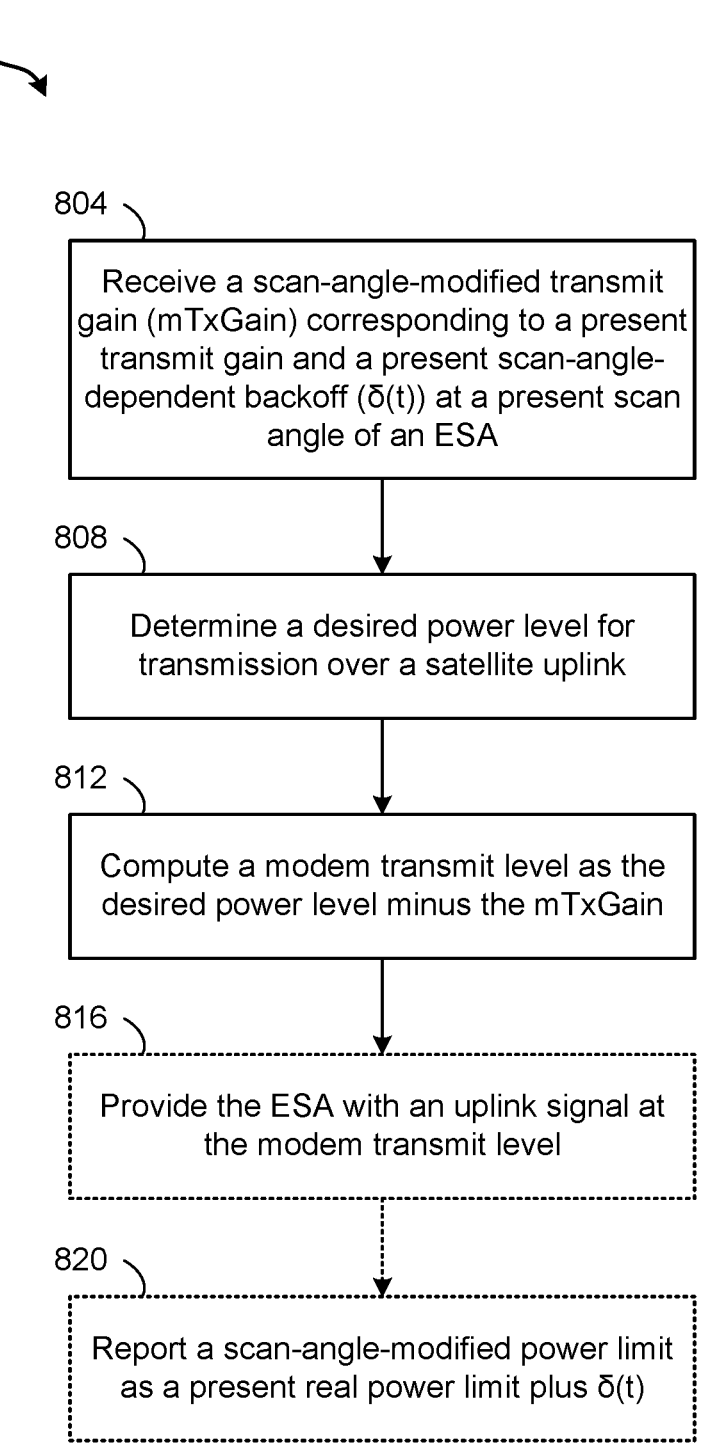
FIG. 8 shows a flow diagram of another illustrative method for transmit power density limit normalization.

FIG. 8 shows a flow diagram of another illustrative method 800 for transmit power density limit normalization. Embodiments of the method 800 can be implemented using any suitable system, such as by the UT modem 110 of FIG. 1. Embodiments of the method 800 begin at stage 804 by receiving, from an electronically steerable antenna (ESA) subsystem, a scan-angle-modified transmit gain (mTxGain) corresponding to a present transmit gain and a present scan-angle-dependent backoff (δ(t)) at a present scan angle of the ESA subsystem. In some implementations, the mTx-Gain is received as a single value from the ESA subsystem that corresponds to the present transmit gain plus δ(t) (i.e., the δ(t) is implicit). In other implementations, the mTxGain is received by separately receiving from the ESA subsystem the present transmit gain and the δ(t) (i.e., the δ(t) is explicit). Such implementations can further compute the mTxGain as a sum of the present transmit gain and the δ(t). At stage 808, embodiments can determine a target power level for transmission over a satellite uplink. At stage 812, embodiments can compute a modem transmit level as the target power level minus the mTxGain.

In some embodiments, at stage 816, the method 800 can include providing a signal to the ESA subsystem at the modem transmit level, such that the signal will be transmitted by the ESA subsystem to the satellite at a target transmit level. For example, as described with reference to FIG. 2, the signal is provided by the UT modem at a transmit level (TxLevel) that is the target transmit level less the transmit power gain of the ESA subsystem. In some embodiments, at stage 820, the method 800 can include reporting a scan-angle-modified power limit as a present real power limit plus δ(t). Though not explicitly shown, some embodiments of the method 800 can include stages of the method 700, except as performed by the UT modem. For example, as a corollary to stage 720, embodiments of the method 800 can include receiving a scan-angle-modified maximum uplink power level (mPmax) from the ESA subsystem corresponding to a real maximum uplink power level plus δ(t); and computing a scan-angle-modified power headroom (mPHR) based on the mPmax, such that the mPHR corresponds to a real power headroom plus δ(t), wherein the scan-angle-modified power limit is reported as the mPHR. As a corollary to stage 724, embodiments of the method 800 can include reporting the scan-angle-modified power limit by sending the scan-angle-modified power headroom as a control signal for transmission by the ESA subsystem over a control channel of the satellite uplink. As a corollary to stage 728, embodiments of the method 800 can include receiving a resource block allocation responsive to the reporting of the scan-angle-modified power limit.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. An electronically steerable antenna (ESA) subsystem comprising:
   an ESA; and
   an ESA controller configured to:
      determine a present scan angle of the ESA;
      determine a present scan-angle-dependent backoff ($\delta(t)$) at the present scan angle of the ESA, wherein the $\delta(t)$ is one of a plurality of $\delta$ values stored at the ESA subsystem, each in association with a respective one or more scan angles;
      transmit, to a modem, a scan-angle-modified transmit gain (mTxGain) corresponding to a present transmit gain and the $\delta(t)$;
      receive, from the modem responsive to transmitting the mTxGain, an uplink signal at a modem transmit level computed by the modem based on a target power level for transmission over a satellite uplink minus the mTxGain; and transmit the uplink signal over the satellite uplink via the ESA at the target power level.

2. The ESA subsystem of claim 1, further comprising:
   a $\delta$ data store in communication with the ESA controller to store a plurality of $\delta$ values, each associated with a scan angle of the ESA, wherein the ESA controller is configured to obtain the $\delta(t)$ by querying the $\delta$ data store for the one of the plurality of $\delta$ values that is associated with the present scan angle of the ESA subsystem.

3. The ESA subsystem of claim 2, wherein the ESA controller is configured to determine the present scan angle by determining both the present scan angle and a present azimuth of the ESA, and each of the plurality of $\delta$ values in the $\delta$ data store is associated with at least one scan angle and at least one azimuth of the ESA.

4. The ESA subsystem of claim 1, wherein the ESA controller is configured to transmit the mTxGain to the modem as a single value that corresponds to the present transmit gain plus $\delta(t)$.

5. The ESA subsystem of claim 1, wherein the ESA controller is configured to transmit the mTxGain to the modem by separately transmitting the present transmit gain and the $\delta(t)$, such that the mTxGain is computed by the modem as a sum of the present transmit gain and the $\delta(t)$.

6. The ESA subsystem of claim 1, wherein the ESA controller is further configured to:
   receive a scan-angle-modified power limit from the modem responsive to transmitting the mTxGain, the scan-angle-modified power limit computed by the modem as a present real power limit modified by $\delta(t)$.

7. The ESA subsystem of claim 6, wherein the scan-angle-modified power limit is a scan-angle-modified power headroom (mPHR) computed by the modem based on a scan-angle-modified maximum uplink power level (mPmax) corresponding to a real maximum uplink power level plus $\delta(t)$, such that the mPHR corresponds to a real power headroom plus $\delta(t)$.

8. The ESA subsystem of claim 6, wherein the ESA controller is further configured to:
   transmit the scan-angle-modified power limit as a control signal over a control channel of the satellite uplink.

9. A user terminal comprising:
   the ESA subsystem of claim 1; and
   a modem, communicatively coupled with the ESA subsystem, and configured to:
      receive the mTxGain from the ESA subsystem;
      compute the modem transmit level; and
      transmit the uplink signal to the ESA subsystem at the modem transmit level for transmission by the ESA subsystem at the transmit power via the satellite uplink.

10. The user terminal of claim 9, wherein the modem is further configured to:
   compute a scan-angle-modified power limit as a present real power limit modified by $\delta(t)$; and
   report the scan-angle-modified power limit to the ESA subsystem.

11. The user terminal of claim 10, wherein the modem is further configured to:
   receive a scan-angle-modified maximum uplink power level (mPmax) corresponding to a real maximum uplink power level plus $\delta(t)$,
   wherein the modem is configured to compute the scan-angle-modified power limit as a scan-angle-modified power headroom (mPHR) based on the mPmax, such that the mPHR corresponds to a real power headroom plus $\delta(t)$.

12. The user terminal of claim 10, wherein the modem is further configured to:
   receive a resource block allocation responsive to reporting the scan-angle-modified power limit.

13. A method for transmit power density limit normalization in a user terminal having an electronically steerable antenna (ESA), the method comprising:

determining a present scan angle of the ESA;

determining a present scan-angle-dependent backoff ($\delta(t)$) at the present scan angle of the ESA, wherein the $\delta(t)$ is one of a plurality of stored $\delta$ values, each associated with a respective one or more scan angles;

obtaining an uplink signal at a modem transmit level computed based on a target power level for transmission over a satellite uplink minus a scan-angle-modified transmit gain (mTxGain) corresponding to a present transmit gain and the $\delta(t)$; and transmitting the uplink signal over the satellite uplink by the ESA at the target power level.

14. The method of claim 13, wherein the obtaining comprises:

transmitting the mTxGain to a modem; and receiving the uplink signal at the modem transmit level as computed by the modem responsive to transmitting the mTxGain.

15. The method of claim 13, wherein the determining the $\delta(t)$ comprises querying the plurality of stored $\delta$ values to determine $\delta(t)$ as the one of the plurality of stored $\delta$ values that is associated with the present scan angle of the ESA.

16. The method of claim 13, wherein determining the present scan angle comprises determining both the present scan angle and a present azimuth of the ESA, and each of the plurality of $\delta$ values is associated with at least one scan angle and at least one azimuth of the ESA.

17. The method of claim 13, further comprising:

obtaining a scan-angle-modified power limit computed as a present real power limit modified by $\delta(t)$.

18. The method of claim 17, wherein the scan-angle-modified power limit is a scan-angle-modified power headroom (mPHR) computed based on a scan-angle-modified maximum uplink power level (mPmax) corresponding to a real maximum uplink power level plus $\delta(t)$, such that the mPHR corresponds to a real power headroom plus $\delta(t)$.

19. The method of claim 17, further comprising:

transmitting the scan-angle-modified power limit as a control signal over a control channel of the satellite uplink.

20. The method of claim 13, further comprising:

receiving a resource block allocation responsive to transmitting the scan-angle-modified power limit.

*   *   *   *   *